United States Patent
Hong et al.

(10) Patent No.: US 9,419,296 B2
(45) Date of Patent: *Aug. 16, 2016

(54) INTEGRATED DESIGN OF BURNER, REFORMER AND HEAT EXCHANGERS FOR THE SOLID OXIDE FUEL CELL

(71) Applicant: Institute of Nuclear Energy Research, Atomic Energy Council, Executive Yuan, R.O.C., Taoyuan County (TW)

(72) Inventors: Wen-Tang Hong, Nantou County (TW); Cheng-Nan Huang, Taoyuan County (TW); Shih-Kun Lo, Taoyuan County (TW); Hsueh-I Tan, New Taipei (TW); Huan-Chan Ting, New Taipei (TW); Chen-Po Lai, Hsinchu County (TW)

(73) Assignee: INSTITUTE OF NUCLEAR ENERGY RESEARCH, ATOMIC ENERGY COUNCIL, Executive Yuan, R.O.C., Lungtan, Taoyuan (TW)

(*) Notice: Subject to any disclaimer, the term of this patent is extended or adjusted under 35 U.S.C. 154(b) by 488 days.

This patent is subject to a terminal disclaimer.

(21) Appl. No.: 13/833,314

(22) Filed: Mar. 15, 2013

(65) Prior Publication Data
US 2014/0065500 A1 Mar. 6, 2014

(30) Foreign Application Priority Data
Aug. 31, 2012 (TW) .............................. 101131962 A

(51) Int. Cl.
*H01M 8/06* (2016.01)
*H01M 8/04* (2016.01)
*F23C 7/06* (2006.01)
*C01B 3/38* (2006.01)
*B01J 8/02* (2006.01)
*H01M 8/12* (2016.01)

(52) U.S. Cl.
CPC ............ *H01M 8/0618* (2013.01); *B01J 8/0214* (2013.01); *B01J 8/0278* (2013.01); *B01J 8/0285* (2013.01); *C01B 3/384* (2013.01); *F23C 7/06* (2013.01); *H01M 8/04014* (2013.01); *H01M 8/04022* (2013.01); *H01M 8/04097* (2013.01); *H01M 8/0631* (2013.01); *B01J 2208/0053* (2013.01); *B01J 2208/00221* (2013.01); *B01J 2208/00504* (2013.01); *B01J 2208/00902* (2013.01); *B01J 2208/00938* (2013.01); *C01B 2203/0233* (2013.01); *C01B 2203/066* (2013.01); *C01B 2203/0816* (2013.01); *C01B 2203/1241* (2013.01); *F23C 2900/03002* (2013.01); *H01M 8/0662* (2013.01); *H01M 2008/1293* (2013.01); *Y02E 60/50* (2013.01); *Y02E 60/525* (2013.01); *Y02P 20/129* (2015.11)

(58) Field of Classification Search
None
See application file for complete search history.

(56) References Cited

U.S. PATENT DOCUMENTS

| | | | |
|---|---|---|---|
| 6,749,958 B2 * | 6/2004 | Pastula | C01B 3/38 429/423 |
| 8,883,360 B2 * | 11/2014 | Hong et al. | 429/423 |
| 2013/0101912 A1 * | 4/2013 | Hong et al. | 429/423 |

* cited by examiner

*Primary Examiner* — Barbara Gilliam
*Assistant Examiner* — Adam A Arciero
(74) *Attorney, Agent, or Firm* — Jackson IPG PLLC; Demian K. Jackson

(57) ABSTRACT

Thermotechnical units of solid oxide fuel cell (SOFC) are integrated as a whole one. The units may include a burner, a reformer and a heat exchanger. The integrated units can be easily assembled into an SOFC system with cell stacks. Thus, the present invention has a simple structure, operates with ease, saves operational cost, runs with fewer utilities, decreases heat dissipation and enhances system performance.

9 Claims, 5 Drawing Sheets

INTEGRATED DESIGN OF BURNER, REFORMER AND HEAT EXCHANGERS FOR THE SOLID OXIDE FUEL CELL

TECHNICAL FIELD OF THE INVENTION

The present invention relates solid oxide fuel cell (SOFC); more particularly, relates to integrating a burner, a reformer and heat exchangers as a whole one for being easily assembled into an SOFC system together with cell stacks, where the present invention thus has a simple structure and a small size with reduced pollution, saved cost, flexible operation and enhanced performance.

DESCRIPTION OF THE RELATED ARTS

Following the development of economy, energy consumption becomes greater and greater with environment heavily polluted and future of human tremendously endangered. Among those dangerous factors for the future of human, green house effect may be one of the most serious. New energies and related technologies may be solutions. Wind energy is a new energy but is limited by environment. Photoelectrical conversion is a related technology but its conversion rate is not satisfied. Terrestrial heat is also a choice but its resource is not abundant. On the contrary, fuel cells are welcomed for their low pollution, low noise, high efficiency and wide application. Fuel cells are not used for storing energy only nor for working by burning fuels. They are functioned through electrochemical reactions, where the chemical energy in the fuels is turned into electrical energy with heat released. Fuel cells use hydrogen as a main fuel. Therein, SOFC uses solid materials as electrolytes and, thus, has a simpler electrode design then the other fuel cells while only reactions in solid and gas phases are concerned. Besides, it is operated at a high temperature for a high performance. The high-quality heat thus obtained can be used for re-generating power through a gas turbine. Hence, SOFC has obvious advantages over the other fuel cells.

Hydrogen does not exist alone in nature. Hence, hydrogen generation technologies become very important. For obtaining a hydrogen-rich material, methane, methanol, ethanol, natural gas, liquefied petroleum gas and gasoline are used to be reformed at high temperature, where reformers are used and different heat energy amounts are required for different reforming methods. For example, utilities may become large and consumes very much energy in a thermoelectric system. Therefore, most fuel cells will use burners to recycle residual fuels to improve heat energy of tail gas and, then, to provide the heat energy to reformers for reforming the fuels for enhancing system performance. Most SOFCs have to be operated under temperatures more than 800 Celsius degrees (° C.) and inlets of their anode and cathode ends have to have temperatures more than 700° C. Naturally, the gas at the anode end has a temperature more than 700° C. after the reformation process. Yet, the gas at the cathode end needs to be heated by several heat exchangers to reach a temperature more than 700° C.

SOFC uses the hydrogen gas for an electrochemical reaction to generate electric energy and the un-reacted residual fuel will be guided into the burner to be burned for enhancing heat energy of the tail gas; and the heat energy will be provided to the reformer for fuel reformation and, thus, to enhance system performance. However, in general, the reformer has to be operated at a temperature more than 700° C. and, if the burner and the reformer are both stand-alone, they are connected by pipes to make heat dissipation a big problem. For facing the problem, the operation temperature of the burner sometimes has to be over 1000° C. to provide enough heat energy to the reformer for the reformation reaction. Hence, not only the heat dissipation is great but also the system performance is not good. In a word, if the burner, the reformer and the heat exchanger are not integrated together, the whole structure becomes complex with the great heat dissipation and the bad system performance remained.

In the U.S. Pat. No. 6,749,958 B2, "Integrated module for solid oxide fuel cell systems", the burner, the reformer and the heat exchanger are integrated into one. The burner is at the innermost circle; the second layer is the heat exchanger; and the outermost layer is the fuel reformer. The sequence for heat transference is that the heat of the tail gas obtained from the burner after burning is transferred to the heat exchanger for heating up air at the cathode end and, then, the heat is transferred to the reformer for fuel reformation. But, on applying this prior art to SOFC, the cells may be broken owing to a lethal temperature difference happened when the gases from the anode and cathode ends enter into the cell stacks.

In the U.S. Pat. No. 7,156,886 B2, "Reforming apparatus", only the burner and the reformer are integrated together by simply stacking them. The burner is put under the reformer, where the tail gas obtained after burning is provided to the reformer for fuel reformation. Yet, heat dissipation of the burner and reformer is still too much.

In the patent US 2010/0136378 A1, "Fuel reformer burner of fuel cell system", the burner and the reformer are integrated together, where the burner avoids flashback of hydrogen. However, for there is no flameholder in the burner, flame may be put off when the fuel is in a lean oil area.

Hence, the prior arts do not fulfill all users' requests on actual use.

SUMMARY OF THE INVENTION

The main purpose of the present invention is to integrate a burner, a reformer and a heat exchanger as a whole one for being easily assembled into an SOFC system together with cell stacks, where the present invention thus has a simple structure and a small size with reduced pollution, saved cost, flexible operation and enhanced performance.

To achieve the above purpose, the present invention is an SOFC apparatus integrated with thermotechnical units, comprising a burner, a reformer, an air preheater and a hot air outlet unit, where the burner has an igniter; the reformer surrounds on outer surface of the burner; the air preheater surrounds on outer surface of the reformer; and the hot air outlet unit surrounds on outer surface of the air preheater. Accordingly, a novel SOFC apparatus integrated with thermotechnical units is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is the view showing the preferred embodiment according to the present invention;

DESCRIPTION OF THE PREFERRED EMBODIMENT

The following description of the preferred embodiment is provided to understand the features and the structures of the present invention.

Please refer to FIG. 1 to FIG. 5, which are a view showing a preferred embodiment according to the present invention; a sectional view showing the preferred embodiment; a view showing a fuel sprayer; a view showing a distributing ring; and a view showing a diffusing plate. As shown in the figures, the present invention is a solid oxide fuel cell (SOFC) apparatus integrated with thermotechnical units, comprising a burner 100, a reformer 300, an air preheater 400 and a hot air outlet unit 500.

Figure 1:
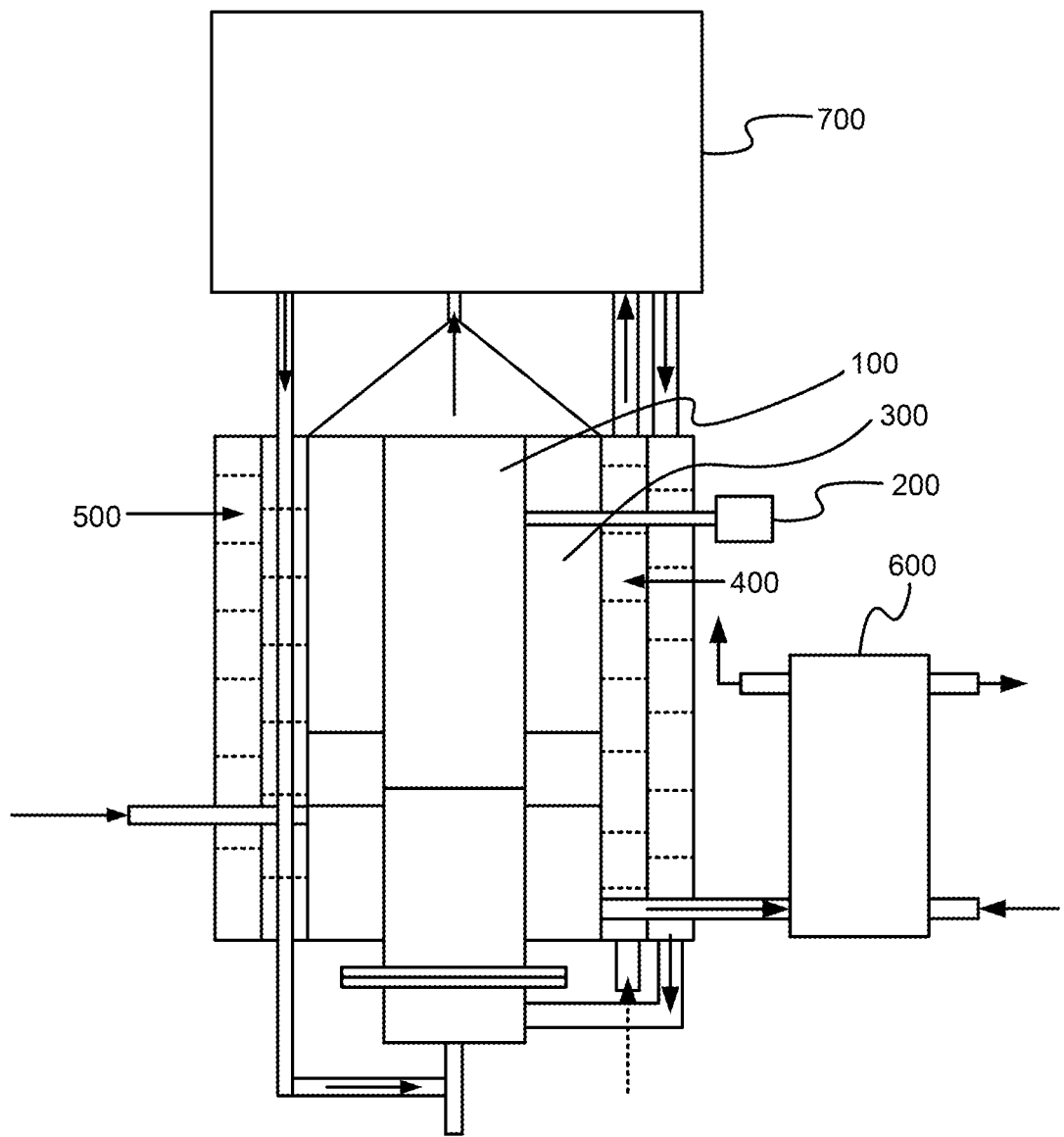
Figure 2:
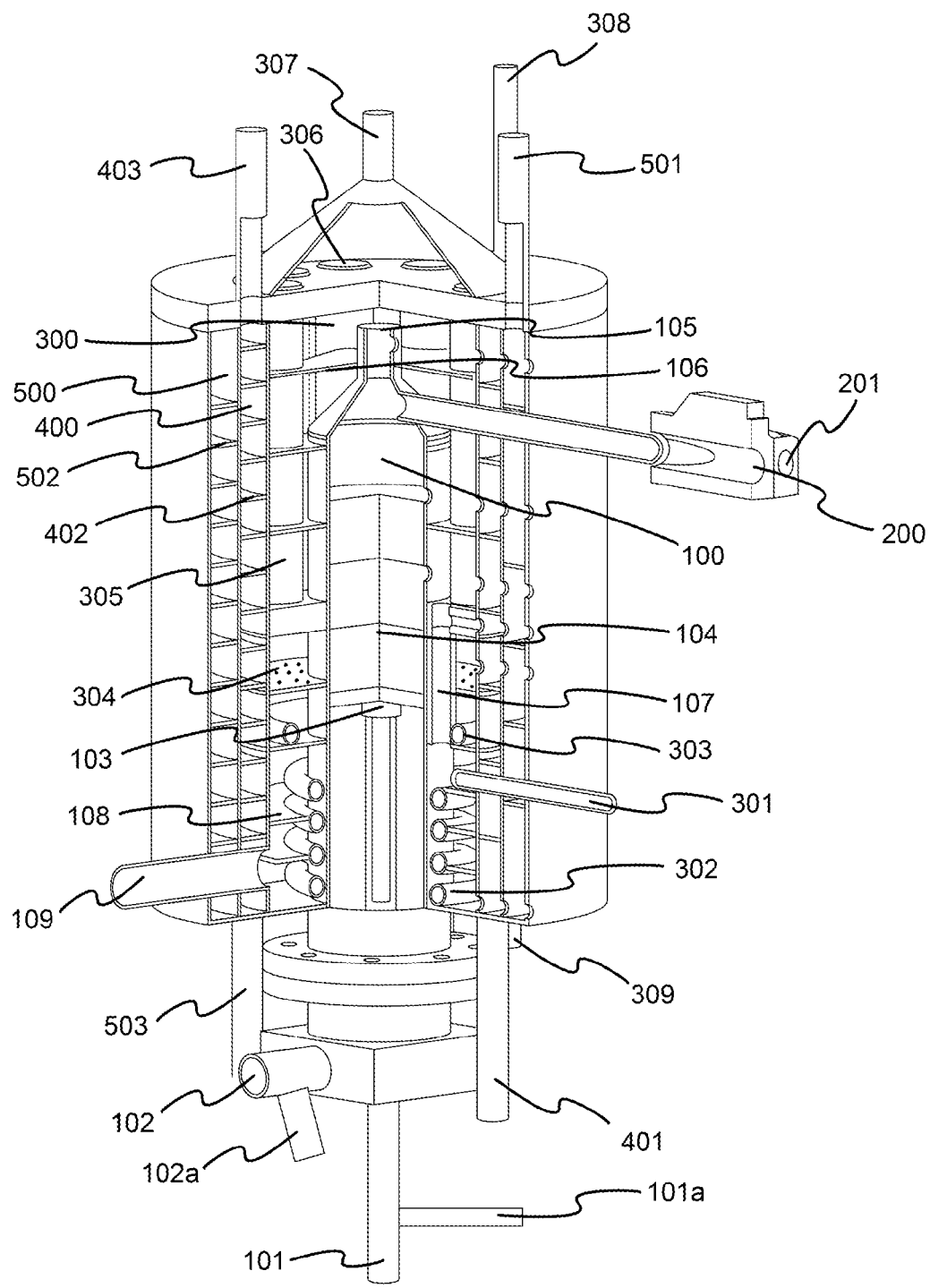
FIG. 2 is the sectional view showing the preferred embodiment.
Figure 3:
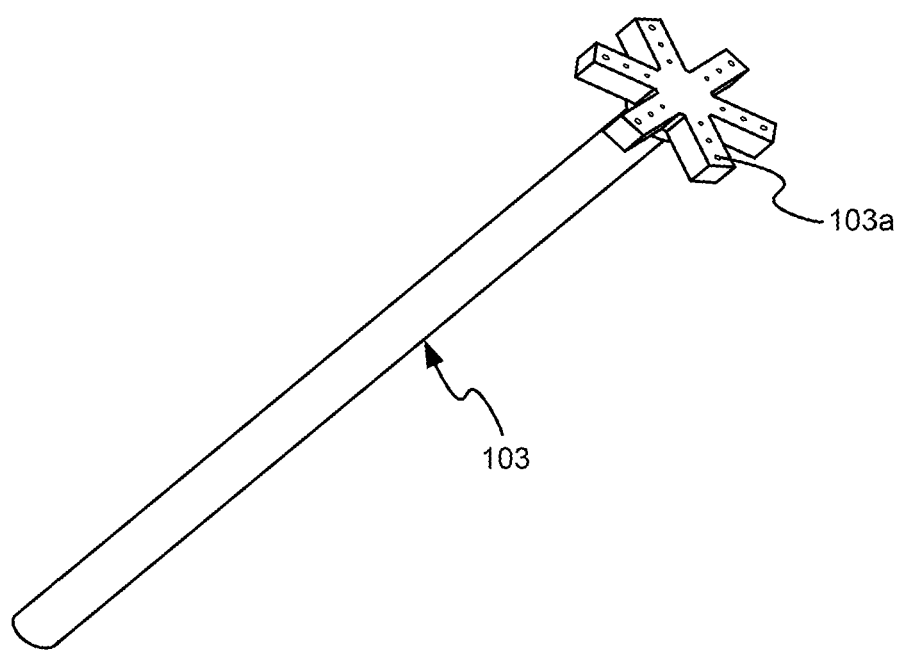
FIG. 3 is the view showing the fuel sprayer.

The burner 100 comprises an igniter 200 having a natural gas and air inlet 201; a natural gas inlet 101; an anode residual fuel inlet 101a connected with the natural gas inlet 101; an oxidant inlet 102 connected with the cathode residual air 102a; a fuel sprayer 103 connected with the natural gas inlet 101 and the anode residual fuel inlet 101a; a porous medium 104 set on the fuel sprayer 103; a burner tail gas outlet 105 set at an end of the burner 100; a tail gas guiding plate 106 set at the burner tail gas outlet 105; a tail gas guiding channel 107 set at a side of the burner 100; a tail gas guiding blade 108 set on outer surface of the burner 100; and a burner tail gas outlet 109 connected with the reformer 300. The fuel sprayer 103 has a plurality of fuel-spraying holes 103a (as shown in FIG. 3) to spray fuels to the porous medium 104 through the fuel-spraying holes 103a to be burned with air entered from the oxidant inlet 102 or the cathode residual fuel inlet 102a. The burner tail gas outlet 109 further comprises a heat exchanger 600.

Figure 4:
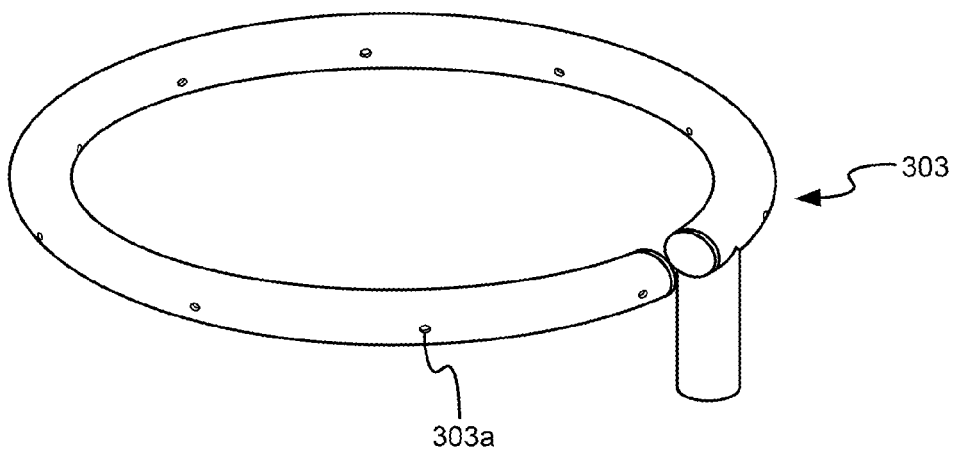
FIG. 4 is the view showing the distributing ring.
Figure 5:
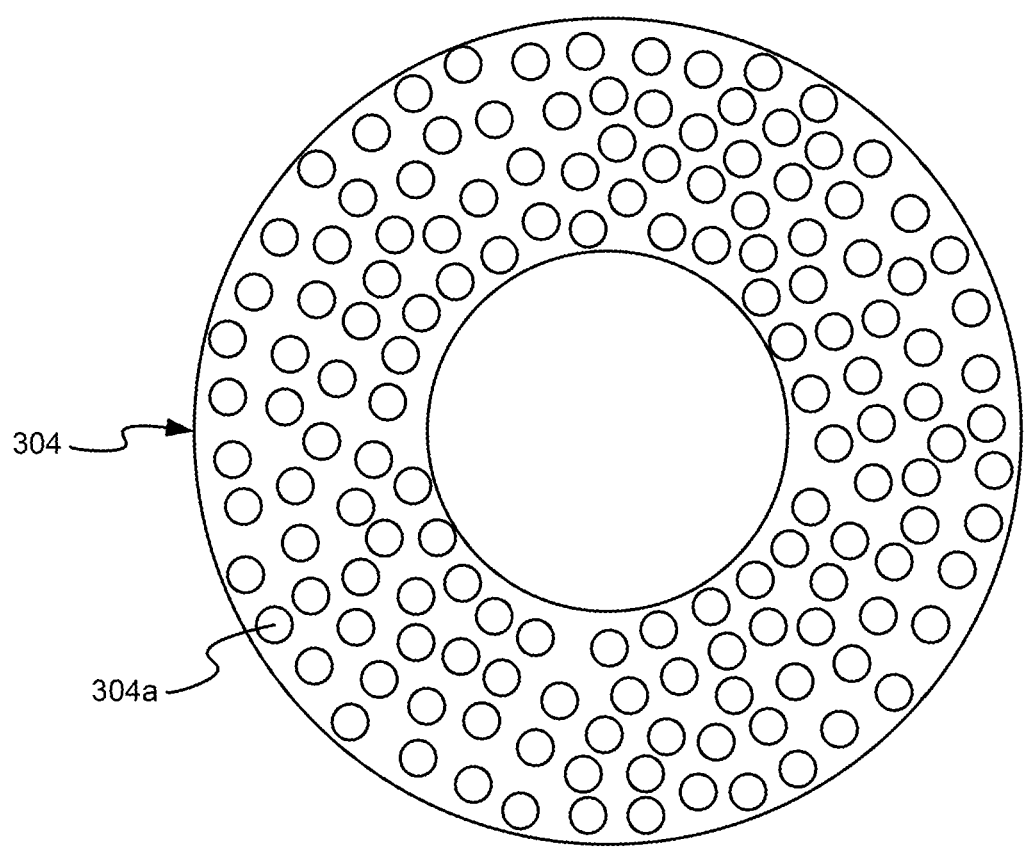
FIG. 5 is the view showing the diffusing plate.

The reformer 300 surrounds on outer surface of the burner 100 and comprises a fuel inlet 301 to inlet fuels; a preheating tube 302 to preheat the fuels; a distributing ring 303 to distribute the fuels; a diffusing plate 304 to diffuse the fuels; a fuel reformer 305 to reform the fuels; a fuel reformer outlet 306; a reformed gas outlet 307; an anode gas outlet 308; and an anode gas tube outlet 309. The distributing ring 303 has a plurality of distributing outlets 303a (as shown in FIG. 4) to distribute the fuels after preheated for evenly distributing the preheated fuels into the diffusing plate 304. The diffusing plate 304 has a plurality of diffusing holes 304a (as shown in FIG. 5), where, after the fuels are distributed into the diffusing plate 304 through the distributing outlets 303a, the fuels are evenly diffused into the fuel reformer 305 through the diffusing holes 304a to be reformed.

The air preheater 400 surrounds on outer surface of the reformer 300; and comprises a fresh air inlet 401, a plurality of air guiding plates 402 in the air preheater 400, and a preheated air outlet 403.

The hot air outlet unit 500 surrounds on outer surface of the air preheater 400; and comprises a hot air inlet 501, a plurality of hot air guiding plates 502 in the hot air outlet unit 500 and a cooled air outlet 503.

Thus, a novel SOFC apparatus integrated with thermotechnical units is obtained.

On using the present invention, the burner 100 is ignited by the igniter 200 at first. Then, a natural gas is entered in through the natural gas inlet 101 to be sprayed through the fuel sprayer 103 and burned with air entered from the oxidant inlet 102, where the burning is happened in an area of the porous medium 104 in the burner 100. A tail gas obtained after burning is at first passed through the burner tail gas outlet 105 and, then, entered into the tail gas guiding plate 106, where heat is provided to a catalyst of the fuel reformer 305 for fuel reformation. Then, the tail gas enters into the tail gas guiding channel 107 to pass through a fuel diffusing area of the diffusing plate 304 and the distributing ring 303. The tail gas then enters into a preheating area of the tail gas guiding blade 108 to provide heat for preheating the fuels. At last, the tail gas can be exhausted to the heat exchanger 600 through the reformer tail gas outlet 109 to absorb heat for fully using the heat of the tail gas obtained after burning.

When the fuels (usually including natural gas, air and water with different ratios according to the reformation method used) enters into the reformer for fuel reformation, the fuels are passed into the preheating tube 302 through the fuel inlet 301 to be preheated by absorbing the heat of the tail gas. Then, the fuels enter into the distributing ring 303 to be evenly sprayed out. Then, the fuels are evenly diffused through the diffusing plate 304 and enter into the fuel reformer to be reformed with the catalyst for forming a hydrogen-rich gas by absorbing the great amount of heat provided by the tail gas. At last, the reformed gas thus obtained enters into the cell stacks 700 through the fuel reformer outlet 306 and the reformed gas outlet 307 to process an electrochemical reaction. The unreacted residual hydrogen-rich gas enters into the air preheater 400 through the anode gas outlet 308 to provide some heat for preheating air at the cathode end. Then, through the anode gas tube outlet 309, the residual hydrogen-rich gas is guided back to the anode residual fuel inlet 101a to enter into the burner 100 through the fuel sprayer 103 for burning. Meanwhile, the amount of the gas added through the natural gas inlet 101 can be gradually reduced to none until the whole operation becomes stable.

Air required at the SOFC cathode end at first enters into the air preheater 400 through the fresh air inlet 401; and, then, gradually absorbs heat of the tail gas of the burner 100 and heat of the high-temperature hot air at the cathode end through the air guiding plates 402 for preheating air to the temperature required at the cathode residual fuel inlet 102a. Then, the air enters into the SOFC through the preheated air outlet 403 to process the electrochemical reaction in the SOFC with the hydrogen-rich gas at the anode end, while the air at the cathode end absorbs heat in the SOFC again for turning up the temperature. Then, the air enters into the hot air outlet unit 50 through the hot air inlet 501 and gradually provides some heat energy to the air preheater 400 through the hot air guiding plates 502 for preheating fresh air and turning down the temperature of the air at the cathode end. Then, after the temperature of the air is turned down at the cathode end, the air enters into the burner 100 through the cooled air outlet 503, connected with the cathode residual air inlet 102a, to be burned at the porous medium 104 with the residual fuels from the anode end. Meanwhile, the amount of air originally added through the oxidant inlet 102 is gradually reduced until only a little air is left to control the temperature of the porous medium 104 in the burner 100 for keeping the whole operation stable.

To sum up, the present invention is a solid oxide fuel cell apparatus integrated with thermotechnical units, where a burner, a reformer and a heat exchanger are integrated as a whole one for being easily assembled into an SOFC system together with cell stacks; and, thus, the present invention has a simple structure and a small size with reduced pollution, saved cost, flexible operation and enhanced performance.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A solid oxide fuel cell (SOFC) apparatus comprising
   a burner, said burner having an igniter having a natural gas and air inlet;
   a reformer, said reformer adjacent and surrounding an outer surface of said burner;
   an air preheater, said air preheater adjacent and surrounding an outer surface of said reformer and connected to receive un-reacted residual hydrogen-rich gas, provide heat to preheat air, and return the un-reacted residual hydrogen-rich gas to the burner; and
   a hot air outlet unit, said hot air outlet unit adjacent and surrounding an outer surface of said air preheater.

2. The apparatus according to claim 1, wherein said burner comprises:
   a natural gas inlet;
   an anode residual fuel inlet, said anode residual fuel inlet connected with said natural gas inlet;
   an oxidant inlet, said oxidant inlet connected with said natural gas inlet;
   a fuel sprayer, said fuel sprayer connected with said natural gas inlet and said anode residual fuel inlet;
   a porous medium, said porous medium located on said fuel sprayer;
   a burner tail gas outlet, said burner tail gas outlet located at an end of said burner;
   a tail gas guiding plate, said tail gas guiding plate located at said burner tail gas outlet;
   a tail gas guiding channel, said tail gas guiding channel located at a side of said burner;
   a tail gas guiding blade, said tail gas guiding blade located on outer surface of said burner; and
   a reformer tail gas outlet, said reformer tail gas outlet connected with said reformer.

3. The apparatus according to claim 2, wherein said fuel sprayer has a plurality of fuel-spraying holes.

4. The apparatus according to claim 2, wherein said burner tail gas outlet further comprises a heat exchanger.

5. The apparatus according to claim 1, wherein said reformer comprises
   a fuel inlet to inlet fuels;
   a preheating tube to preheat said fuels;
   a distributing ring to distribute said fuels;
   a diffusing plate to diffuse said fuels;
   a fuel reformer to reform said fuels;
   a fuel reformer outlet;
   a reformed gas outlet;
   an anode gas outlet; and
   an anode gas tube outlet.

6. The apparatus according to claim 5, wherein said distributing ring has a plurality of distributing outlets; said diffusing plate has a plurality of diffusing holes; and, after said fuels are distributed into said diffusing plate through said distributing outlets, said fuels are evenly diffused into said fuel reformer through said diffusing holes to be reformed.

7. The apparatus according to claim 1, wherein said air preheater comprises
   a fresh air inlet;
   a plurality of air guiding plates located in said air preheater; and
   a preheated air outlet.

8. The apparatus according to claim 1, wherein said hot air outlet unit comprises
   a hot air inlet;
   a plurality of hot air guiding plates located in said hot air outlet unit; and
   a cooled air outlet.

9. The apparatus of claim 8, wherein air enters into the hot air outlet unit through the hot air inlet and provides heat energy to the air preheater through the hot air guiding plates so as to preheat fresh air then the air enters into the burner through the cooled air outlet.

* * * * *